(12) United States Patent
Matsuzaki et al.

(10) Patent No.: US 8,510,421 B2
(45) Date of Patent: Aug. 13, 2013

(54) SERVER, TERMINAL APPARATUS, DEVICE REGISTERING SYSTEM, REGISTERING METHOD, REGISTERING PROGRAM AND RECORDING MEDIUM

(75) Inventors: Natsume Matsuzaki, Osaka (JP); Naoshi Usuki, Kyoto (JP); Hiroyuki Iitsuka, Osaka (JP); Hiroki Yamauchi, Osaka (JP)

(73) Assignee: Panasonic Corporation, Osaka (JP)

( * ) Notice: Subject to any disclaimer, the term of this patent is extended or adjusted under 35 U.S.C. 154(b) by 952 days.

(21) Appl. No.: 10/584,850

(22) PCT Filed: Jan. 6, 2005

(86) PCT No.: PCT/JP2005/000078
§ 371 (c)(1),
(2), (4) Date: Feb. 4, 2009

(87) PCT Pub. No.: WO2005/066823
PCT Pub. Date: Jul. 21, 2005

(65) Prior Publication Data
US 2009/0132705 A1 May 21, 2009

(30) Foreign Application Priority Data
Jan. 7, 2004 (JP) .................................. 2004-002323

(51) Int. Cl.
*G06F 15/177* (2006.01)
(52) U.S. Cl.
USPC ............................ 709/221; 709/203; 709/225
(58) Field of Classification Search
USPC .......................... 709/221, 223, 225, 227, 228
See application file for complete search history.

(56) References Cited

U.S. PATENT DOCUMENTS 6,038,674 A * 3/2000 Sasaki et al. ................... 713/500
6,263,201 B1 * 7/2001 Hashimoto et al. ............ 455/403

(Continued)

FOREIGN PATENT DOCUMENTS

| JP | 09-081516 | 3/1997 |
| JP | 2000-215163 | 8/2000 |

(Continued)

OTHER PUBLICATIONS

Supplementary European Search Report mailed May 3, 2012 in corresponding European Application No. 05 70 3346.

(Continued)

*Primary Examiner* — Dhairya A Patel
(74) *Attorney, Agent, or Firm* — Wenderoth, Lind & Ponack, L.L.P.

(57) ABSTRACT

A system including a server holding content and a terminal using the content, whereby the terminal is registered in the server if a communication time between the terminal and the server is less than or equal to a reference value. A measuring unit of the server measures a communication time from transmitting measuring information to the terminal until receiving response information from the terminal, and repeats the transmission, the reception, and the measurement until the measured communication time is less than or equal to the reference value. An elapsed-time measuring unit measures an elapsed time from when the measuring unit first begins measuring the communication time, and a transmission unit transmits, to the terminal, status notification information showing a processing status depending on the elapsed time. A response unit of the terminal receives measuring information from the server and transmits response information to the server when the measuring information is received.

8 Claims, 16 Drawing Sheets

| REFERENCE ELAPSED TIME CHART ||| 
|---|---|---|
| TIME SEGMENT T | REGISTRATION REFERENCE ELAPSED TIME | EXTENSION REFERENCE ELAPSED TIME |
| 0 | 1 MIN | 2 MIN |
| 1 | 2 MIN | 4 MIN |
| 2 | 5 MIN | 8 MIN |
| 3 | 10 MIN | 14 MIN |
| 4 | 15 MIN | 20 MIN |

(56) References Cited

U.S. PATENT DOCUMENTS

| | | | |
|---|---|---|---|
| 6,363,430 B1* | 3/2002 | Thomas | 709/245 |
| 6,397,359 B1* | 5/2002 | Chandra et al. | 714/712 |
| 6,701,361 B1* | 3/2004 | Meier | 709/224 |
| 6,728,809 B1* | 4/2004 | Suzuki et al. | 710/118 |
| 7,028,104 B1* | 4/2006 | Henry et al. | 709/250 |
| 7,072,354 B1* | 7/2006 | Beathard | 370/447 |
| 7,089,307 B2* | 8/2006 | Zintel et al. | 709/224 |
| 7,145,474 B2 | 12/2006 | Shuey et al. | 340/870.03 |
| 7,366,996 B2* | 4/2008 | Hoyle | 715/854 |
| 7,400,615 B2* | 7/2008 | Holeman, Sr. | 370/348 |
| 2002/0032765 A1* | 3/2002 | Pezzutti | 709/223 |
| 2002/0085721 A1 | 7/2002 | Saneto et al. | |
| 2002/0107937 A1* | 8/2002 | Iyoki | 709/217 |
| 2003/0005135 A1* | 1/2003 | Inoue et al. | 709/229 |
| 2003/0126243 A1 | 7/2003 | Kudo et al. | |
| 2003/0142696 A1* | 7/2003 | Holmeide et al. | 370/508 |
| 2003/0195947 A1* | 10/2003 | Tanimoto | 709/219 |
| 2004/0001008 A1* | 1/2004 | Shuey et al. | 340/870.02 |
| 2004/0034502 A1* | 2/2004 | Jung | 702/178 |
| 2004/0107252 A1 | 6/2004 | Futa | |
| 2004/0174824 A1 | 9/2004 | Ohta | |
| 2005/0027858 A1* | 2/2005 | Sloth et al. | 709/224 |
| 2005/0114647 A1 | 5/2005 | Epstein | |
| 2005/0169267 A1* | 8/2005 | Choo et al. | 370/389 |
| 2005/0281198 A1* | 12/2005 | Miyamoto et al. | 370/235 |
| 2006/0256712 A1* | 11/2006 | Imajuku et al. | 370/218 |
| 2009/0070483 A1 | 3/2009 | Futa | |

FOREIGN PATENT DOCUMENTS

| | | |
|---|---|---|
| JP | 2002-169726 | 6/2002 |
| JP | 2002-305514 | 10/2002 |
| JP | 2003-198552 | 7/2003 |
| JP | 2004-304755 | 10/2004 |
| WO | 03/079638 | 9/2003 |

OTHER PUBLICATIONS

Stevens, W.R., "TCP/IP Illustrated, vol. 1, The Protocols, Ping Program", *Professional Computing Series*, Jan. 1, 1994, pp. 85-96.

* cited by examiner

FIG. 3

| REFERENCE ELAPSED TIME CHART | |
|---|---|
| TIME SEGMENT T | REFERENCE ELAPSED TIME |
| 0 | 1 MIN |
| 1 | 2 MIN |
| 2 | 5 MIN |
| 3 | 10 MIN |
| 4 | 15 MIN |

FIG. 4

| MESSAGE LIST ||
|---|---|
| TIME SEGMENT T | DISPLAY MESSAGE |
| 0 | REGISTERING... |
| 1 | REGISTRATION HAS NOT FINISHED. CANCEL? IF CONTINUING, AND IF USING A WIRELESS DEVICE, MOVE DEVICE 2 CLOSER TO DEVICE 1. |
| 2 | REGISTRATION HAS NOT FINISHED. CANCEL? IF CONTINUING, AND IF USING A WIRELESS DEVICE, MOVE DEVICE 2 DIRECTLY BESIDE DEVICE 1. |
| 3 | REGISTRATION HAS NOT FINISHED. CANCEL? IF CONTINUING, CANCEL ANY OTHER CONNECTIONS. |
| 4 | REGISTRATION HAS NOT FINISHED. CANCEL REGISTRATION? |

FIG. 9

| REGISTRATION LIST | | | |
|---|---|---|---|
| ID | VALIDITY PERIOD | | EXTENSION COUNT |
| ID3 | EXPIRED | −2 DAYS | 1 |
| ID4 | VALID | 3 DAYS | 3 |
| ID2 | VALID | 5 DAYS | 0 |

FIG. 10

| EXTENSION CORRELATION CHART ||
|---|---|
| EXTENSION COUNT | EXTENSION DURATION (IN DAYS) |
| 0 | 7 |
| 1 | 10 |
| 2 | 14 |
| 3 | 19 |
| 4 AND ABOVE | 25 |

FIG. 11

| REFERENCE ELAPSED TIME CHART ||| 
|---|---|---|
| TIME SEGMENT T | REGISTRATION REFERENCE ELAPSED TIME | EXTENSION REFERENCE ELAPSED TIME |
| 0 | 1 MIN | 2 MIN |
| 1 | 2 MIN | 4 MIN |
| 2 | 5 MIN | 8 MIN |
| 3 | 10 MIN | 14 MIN |
| 4 | 15 MIN | 20 MIN |

SERVER, TERMINAL APPARATUS, DEVICE REGISTERING SYSTEM, REGISTERING METHOD, REGISTERING PROGRAM AND RECORDING MEDIUM

TECHNICAL FIELD

The present invention relates to a technique for registering a terminal apparatus, which uses content, in a server holding content, and in particular to a technique for improving user-friendliness during registration.

BACKGROUND ART

When using digital copyrighted works such as music, video, video games, etc. (hereinafter, content) on a terminal apparatus, a server which holds the content judges whether the terminal apparatus has usage rights for the content. If judged to have usage rights, the server registers the terminal apparatus and provides the content to the registered terminal apparatus. A technique for judging the status of a content usage right using a credit card number is disclosed in patent document 1, while a technique for judging is performed using a mobile phone in patent document 2.

As one of the above judging techniques, the server transmits a measuring packet to the terminal apparatus, receives a response packet from the terminal apparatus, measures a packet communication time from the transmission of the measuring packet until the reception of the response packet, and judges that the terminal apparatus has usage rights if the measured time is less than or equal to a reference value. This technique is based on the premise that the terminal apparatus has usage rights if a communication time with the server is short, such as a case where the server and the terminal apparatus are in the same house.

Patent Document 1: Japanese Patent Application Publication No. 2002-169726
Patent Document 2: Japanese Patent Application Publication No. 2002-305514

DISCLOSURE OF THE INVENTION

Problems Solved by the Invention

However, the packet communication time varies depending on a condition of communication in a network connecting the server and the terminal apparatus. For example, if a different terminal apparatus is externally accessing this network to download a large piece of data, the packet communication time may exceed the reference value. In such a case, the terminal apparatus may not be registered, regardless of its essentially close proximity, since the packet communication time between the server and the terminal apparatus exceeds the reference value.

Users become concerned when the registration of the terminal apparatus fails under such conditions since they cannot know the communication condition of the network or the processing condition of the server.

An object of the present invention is to provide a server which can eliminate such user concern.

Means to Solve the Problem

The present invention is a server for registering a terminal apparatus if a communication time between the server and the terminal apparatus is less than or equal to a reference value, and providing content to the registered terminal apparatus, the server including a measuring unit operable to measure the communication time, being a time period from transmitting measuring information to an unregistered terminal apparatus until receiving response information from the unregistered terminal apparatus, and repeat the transmission, the reception, and the measurement until the measured communication time is less than or equal to the reference value; an elapsed-time measuring unit operable to measure an elapsed time from when the measuring unit first begins measuring the communication time; and a transmission unit operable, while the transmission, the reception, and the measurement are being repeated, to transmit, to the unregistered terminal apparatus, status notification information showing a processing status which depends on the elapsed time.

Effects of the Invention

The present invention is a server with the above structure.

The present invention is also a terminal apparatus for using content and to be registered in a server holding content, the terminal apparatus including a reception unit operable to receive measuring information from the server; a transmission unit operable to transmit response information to the server when the measuring information is received; and a display unit operable to display a message based on status notification information received from the server.

The present invention is also a device registration system constituted from a server holding content and a terminal apparatus which uses content, the terminal apparatus being registered in the server if a communication time between the server and the terminal apparatus is less than or equal to a reference value. The server includes a measuring unit operable to measure the communication time, being a time period from transmitting measuring information to the terminal apparatus until receiving response information from the terminal apparatus, and repeat the transmission, the reception, and the measurement until the measured communication time is less than or equal to the reference value; an elapsed-time measuring unit operable to measure an elapsed time from when the measuring unit first begins measuring the communication time; and a transmission unit operable to transmit, to the terminal apparatus, status notification information showing a processing status which depends on the elapsed time. The terminal apparatus includes a response unit operable to receive measuring information from the server, and transmit response information to the server when the measuring information is received; and a display unit operable to display a message based on status notification information received from the server.

According to this structure, status notification information which conveys the status of registration is transmitted from the server, and the terminal apparatus displays a message based on the status notification information, thereby enabling the display of a message which eliminates a user's concern.

Here, the server may further include a registration unit operable, when the communication time is less than or equal to the reference value, to register the unregistered terminal apparatus in correspondence with a validity period, and an extension unit operable to perform extension processing to extend the validity period, the extension unit including a control subunit operable to control the measuring unit to repeat the transmission, the reception, and the measurement, and an extension subunit operable to extend the validity period when the communication time is less than or equal to the reference value.

According to this structure, registration from the second time on is performed as extension processing where the validity period is extended as long as the terminal apparatus is in the house, thereby enabling the user to seamlessly use content.

In a case of extension processing, the measuring unit of the server may use a reference value that is greater than a reference value of a case of registering the unregistered terminal apparatus.

According to this structure, security is improved by lowering the reference value and performing rigorous measuring during a first registration. When performing registration processing from the second time on, that is, during extension processing, extension is facilitated by increasing the reference value, thereby enabling an improvement in user-friendliness.

Here, the server may further include a count unit operable to count a number of performed extensions, whereby as the number of performed extensions increases, the extension subunit lengthens a period of extension.

The number of times extension processing is performed increases the longer the terminal apparatus is registered. According to this structure, however, the extension period is lengthened according to the extension count, thereby enabling the number of times extension processing is performed to be reduced.

In a case of extension processing, the measuring unit of the server may attach additional information to the measuring information, the additional information indicating that the measuring information is to be transmitted over a communication route between the server and the registered terminal apparatus with priority over other information.

If additional information is attached to the measuring information, the additional information indicating that a transmission of information is prioritized over other processing on a communication route between the server and the terminal apparatus, the transmission unit of the terminal apparatus may attach the additional information to the response information.

According to this structure, given that the measuring information and the response information is transmitted over the communication route with priority over other information, the measuring information and the response information reach the terminal apparatus more easily even if the communication route is congested, thereby enabling an increased possibility of the communication time being lower than the reference value. As a result, it is possible to facilitate successful extension processing.

Here, the extension unit of the server may prioritize performing the extension processing over other processing if a remaining duration of the validity period is less than a predetermined reference value.

The terminal apparatus may further include a management unit operable, when the terminal apparatus is registered in the server, to manage a validity period for which the terminal apparatus is registered in the server, whereby if a remaining duration of the validity period is less than a preconfigured reference value, and when the measuring information is received, the transmission unit prioritizes transmitting the response information over other processing.

According to this structure, when the validity period is approaching the end, extension processing in the server and the terminal apparatus is performed with priority over other processing, such as the viewing of content, thereby facilitating the successful extension of the validity period.

Here, the server may be a computer with an on-board microprocessor and further include an idle-time detection unit operable to detect idle time when the server is not performing other processing, and the extension unit may perform the extension processing during the detected idle time.

According to this structure, the user can use content without having to worry about the validity period since extension processing is performed while other processing is not being performed.

BRIEF DESCRIPTION OF THE DRAWINGS

FIG. 3 shows a data structure of a reference elapsed time chart;

FIG. 4 shows a structure of a message list;

FIG. 9 shows a data structure of a registration list;

FIG. 10 shows a data structure of an extension correlation chart;

FIG. 11 shows a data structure of a reference elapsed time chart;

Figure 1:
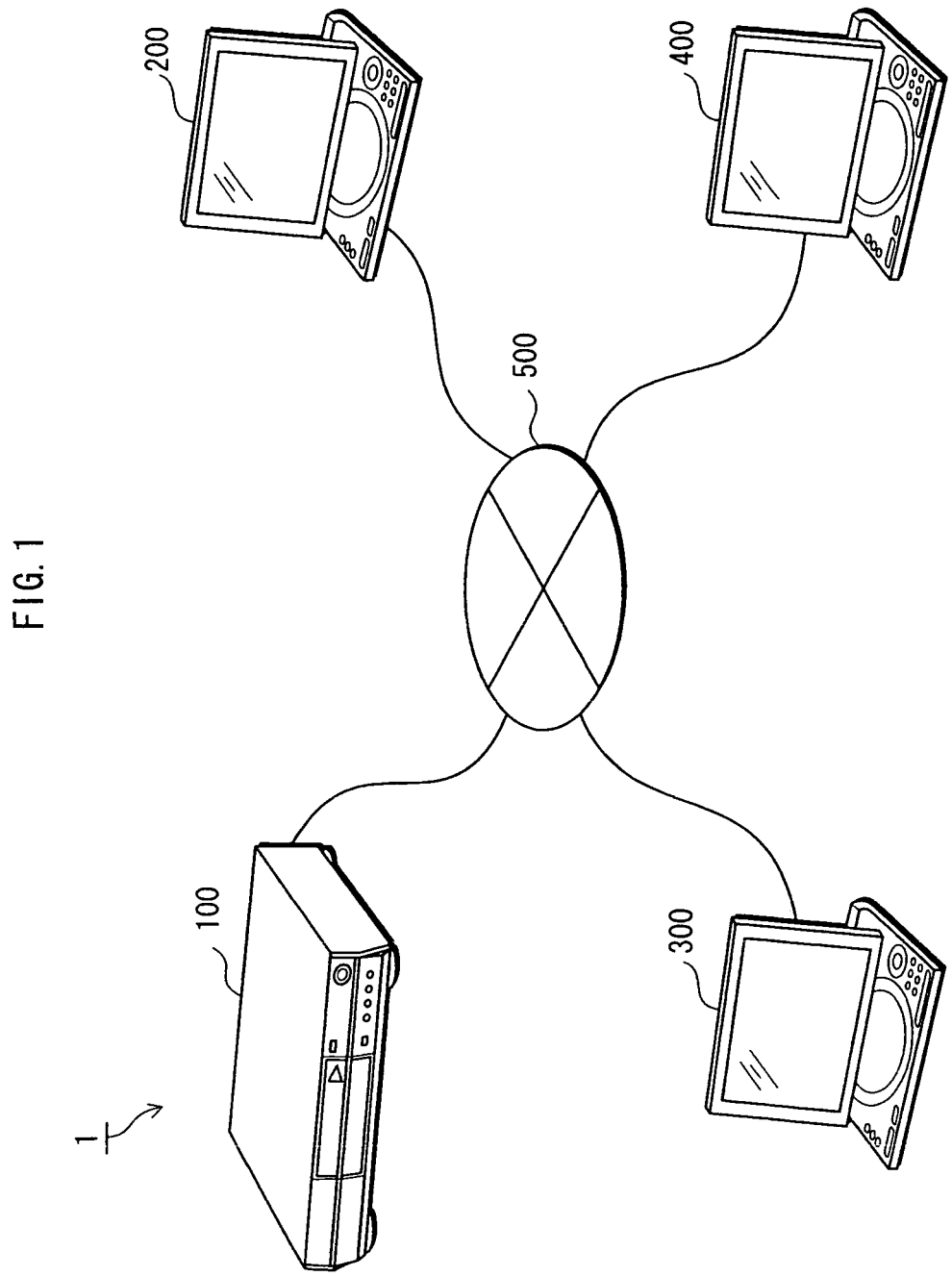
FIG. 1 shows an overall structure of a device registration system 1.

DESCRIPTION OF THE CHARACTERS 1 device registration system
100 server
101 registration list storage unit
102 registration check unit
103 registration processing unit
104 communication unit
105 measured value check unit
106 packet transmission unit
107 reference value storage unit
108 elapsed time measuring unit
109 message notification unit
110 message list storage unit
111 content storage unit
112 content transmission unit
113 clock unit
114b time management unit
115b validity period management unit
116 input/output unit
117 reference elapsed time chart storage unit
119b information storage unit
200 terminal apparatus
201 packet communication unit
202 registration result reception unit
203 message reception unit 204 content playback processing unit
205 communication processing unit
300 terminal apparatus
400 terminal apparatus
500 communication network

BEST MODE FOR CARRYING OUT THE INVENTION

Embodiment 1

1. Structure of a Device Registration System 1

As shown in FIG. 1, the device registration system 1 is constituted from a server 100, a terminal apparatus 200, a terminal apparatus 300, a terminal apparatus 400, and a communication network 500.

The terminal apparatuses 300 and 400 are connected to the server 100 via the communication network 500, and are already registered. A user can use the registered terminal apparatuses 300 and 400 to view, via the network 500, content which is stored on the server 100.

The following describes a case in which the user newly connects the terminal apparatus 200 to the communication network 500, whereby the terminal apparatus 200 is then registered in the server 100.

By registering the terminal apparatus 200 in the server 100, the user will be able to use the terminal apparatus 200 to view, via the communication network 500, content which is stored in the server 100.

The following describes the apparatuses pertaining to the first embodiment.

1.1 Structure of the Server 100

Figure 2:
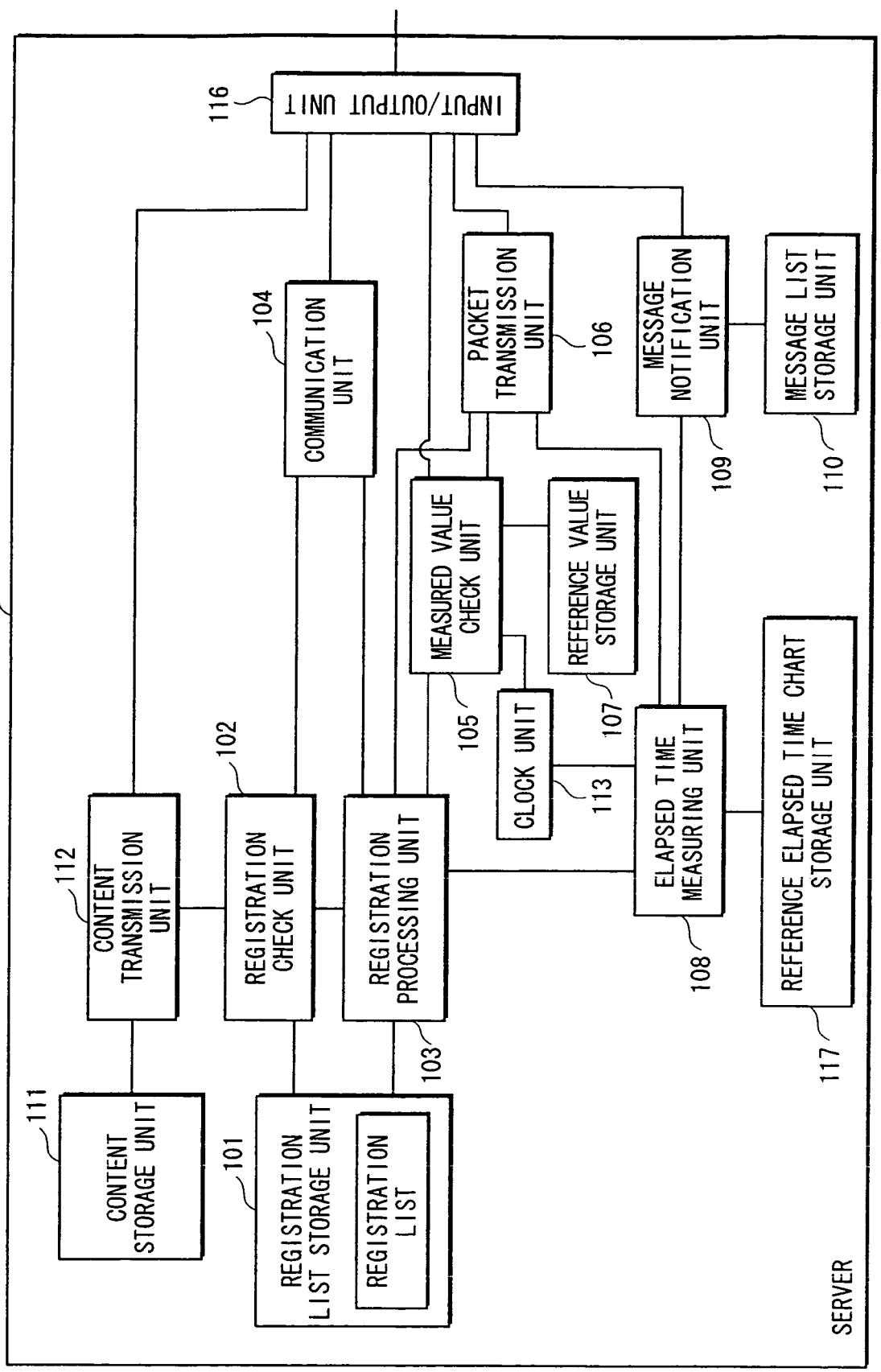
FIG. 2 is a block diagram showing a structure of a server 100 according to embodiment 1.

As shown in FIG. 2, the server 100 is constituted from a registration list storage unit 101, a registration check unit 102, a registration processing unit 103, a communication unit 104, a measured value check unit 105, a packet transmission unit 106, a reference value storage unit 107, an elapsed time measuring unit 108, a message notification unit 109, a message list storage unit 110, a content storage unit 111, a content transmission unit 112, a clock unit 113, an input/output unit 116, and a reference elapsed time chart storage unit 117.

The server 100 is specifically a computer system constituted from a microprocessor, a ROM, a RAM, a hard disk unit, a display unit, etc.

A computer program is stored on the RAM or the hard disk unit.

The server 100 achieves its functions as a result of the microprocessor operating in accordance with the computer program.

The server 100 distributes content via the communication network 500 to a terminal apparatus which is registered therein, and also registers terminal apparatuses which will view content in the server 100.

The following describes the structures of the server 100.

(1) Registration List Storage Unit 101

The registration list storage unit 101 has stored therein a registration list.

The registration list is a list which records the IDs of terminal apparatuses registered in the server 100. An ID3 and an ID4, being identifiers of the terminal apparatus 300 and the terminal apparatus 400 respectively, are already registered in the device registration system 1.

(2) Registration Check Unit 102, Registration Processing Unit 103, and Communication Unit 104

If a registration request is received from the terminal apparatus, or if transmission of content is requested, the registration check unit 102 judges whether the terminal apparatus which made the request is registered.

If a registration request is received from the terminal apparatus 200, the registration check unit 102 reads the registration list from the registration list storage unit 101 and judges whether an ID2 of the terminal apparatus 200 is registered. If the ID2 is registered in the registration list, the registration check unit 102 judges that the terminal apparatus 200 is already registered and outputs the judgment result to the communication unit 104.

If the ID2 is not registered, the registration check unit 102 judges that the terminal apparatus 200 is unregistered and outputs the judgment result to the registration processing unit 103.

Similarly, if transmission of content is requested, the registration check unit 102 judges whether the ID of the terminal apparatus which made the request is registered. If the terminal apparatus is judged to be unregistered, the registration check unit 102 outputs a judgment result, which shows the terminal apparatus as unregistered, to the communication unit 104. If judged to be registered, the registration check unit 102 outputs a judgment result, which identifies the terminal apparatus as registered, to the content transmission unit 112.

If the check result from the registration check unit 102 indicates non-registration, the registration processing unit 103 performs registration processing. If the measured value check unit 105 judges to permit registration, the registration processing unit 103 writes the ID2 of the terminal apparatus 200 to the registration list, and registers the terminal apparatus 200.

(3) Packet Transmission Unit 106, Reference Value Storage Unit 107, and Measured Value Check Unit 105

The reference value storage unit 107 has stored therein a reference measurement value which is a condition for permitting registration.

In registration processing, the packet transmission unit 106 generates a measuring packet and transmits the measuring packet to the terminal apparatus 200 which made the request.

The measured value check unit 105 receives a response packet from the terminal apparatus 200. The measured value check unit 105 also uses time information, counted by the clock unit 113, to measure a length of time from when the packet transmission unit 106 transmitted the measuring packet to when the response packet is received. The measured value check unit 105 also compares the measured value with the reference measurement value, and judges to permit registration if the measured value is smaller than the reference measurement value. If the measured value is greater than or equal to the reference measurement value, the measured value check unit 105 outputs this comparison result to the packet transmission unit 106.

The packet transmission unit 106 repeatedly transmits the measuring packet until the comparison result from the measured value check unit 105 shows that the measured value is smaller than the reference measurement value, or until registration processing is cancelled. Similarly, the measured value check unit 105 repeatedly receives the response packet, measures the measured value, and performs the comparison with the reference measurement value until the measured value is smaller than the reference measurement value.

(4) Clock Unit 113

The clock unit 113 keeps the current date and time.

(5) Elapsed Time Measuring Unit 108, Message Notification Unit 109, Message List Storage Unit 110, Reference Elapsed Time Chart Storage Unit 117

The reference elapsed time chart storage unit 117 has stored therein a reference elapsed time chart shown in FIG. 3.

The reference elapsed time chart is constituted from correlated time segments T and elapsed times. The time segments T are divided into 5 levels from 0 to 4.

The message list storage unit 110 has stored therein a message list shown in FIG. 4. The message list is constituted from correlated time segments T and display messages. The display messages are text messages transmitted to the terminal apparatus according to an elapsed time, and are displayed on a monitor of the terminal apparatus. The time segments T of the message list correspond to the time segments T of the reference elapsed time chart.

The elapsed time measuring unit 108 measures an elapsed time from when the registration processing starts.

The message notification unit 109 reads, from the message list storage unit 110, a message which depends on an elapsed time measured by the elapsed time measuring unit 108, and transmits the message to the terminal apparatus 200.

When the registration processing starts, the elapsed time measuring unit 108 sets the time segment T to "0", and the message notification unit 109 reads, from the message list, a message which corresponds to time segment T=0, and transmits the message to the terminal apparatus 200.

The elapsed time measuring unit 108 continues to measure an elapsed time from when the registration processing starts, refer to the reference elapsed time chart, and judge whether an elapsed time corresponding to a time segment T has been exceeded until the registration processing ends. Since an elapsed time corresponding to time segment T=0 is 1 minute, the elapsed time measuring unit 108 makes the reference elapsed time 1 minute. When the measured elapsed time exceeds the reference elapsed time of 1 minute, the elapsed time measuring unit 108 increments T to T=1 and outputs a judgment result indicating that T=1 to the message notification unit 109.

The message notification unit 109 reads, from the message list, a message corresponding to time segment T=1, and transmits the message to the terminal apparatus 200.

The elapsed time measuring unit 108 and the message notification unit 109 repeatedly measure an elapsed time, perform a comparison with a reference elapsed time, update the time segment T, and transmit a message until the registration processing ends. Note that here, the greatest time segment T is 4, whereby a new message is not transmitted when a measured elapsed time exceeds a reference elapsed time of 15 minutes which corresponds to T=4.

(6) Content Transmission Unit 112 and Content Storage Unit 111

The content storage unit 111 has stored therein content.

If the check result from the registration check unit 102 indicates registration, the content transmission unit 112 transmits content requested by the terminal apparatus.

(7) Input/Output Unit 116

The input/output unit 116 performs transmission and reception of data, via the communication network 500, with the terminal apparatuses 200 to 400.

1.2 Terminal Apparatus 200

Figure 5:
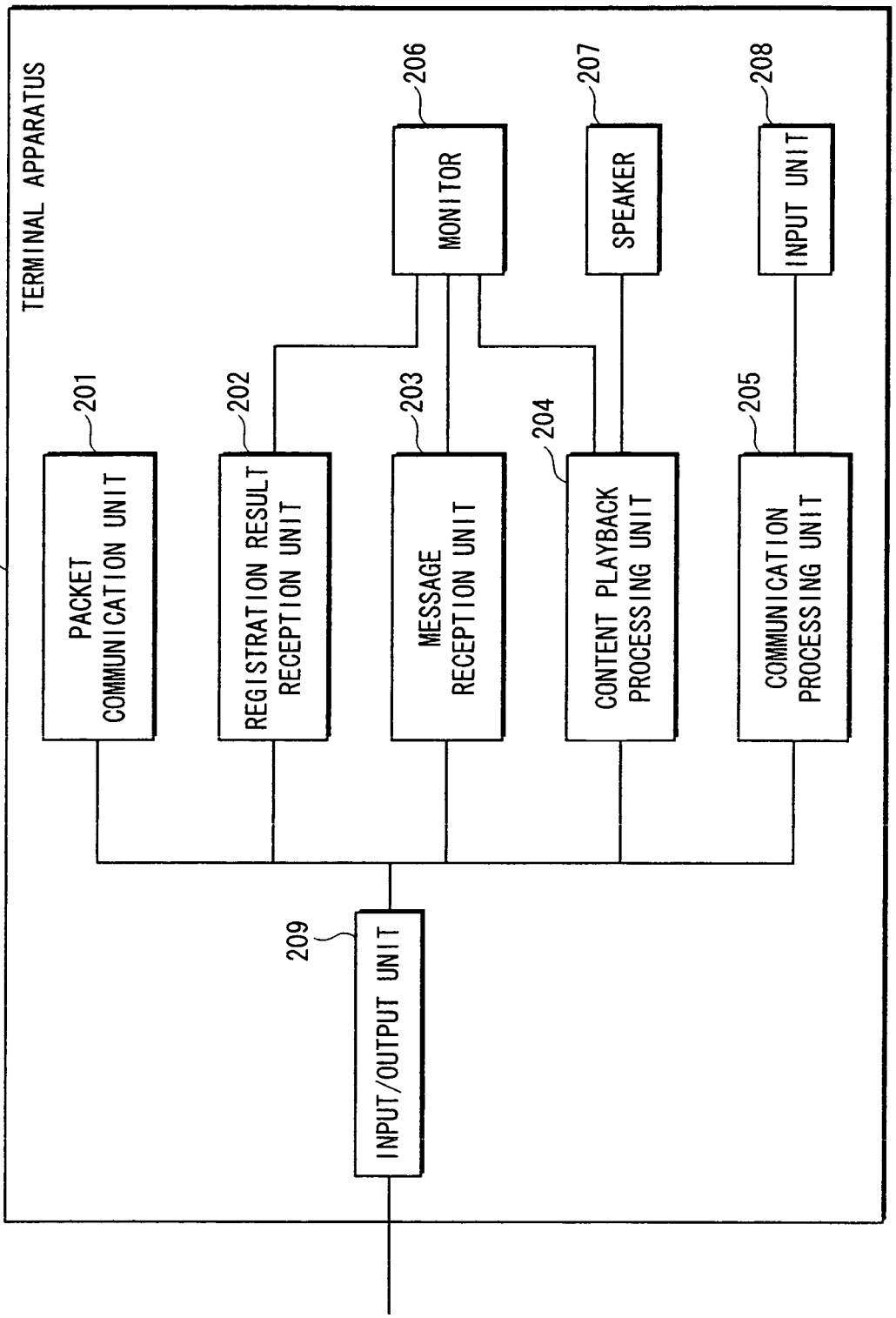
FIG. 5 is a block diagram showing a structure of a terminal apparatus 200.

As shown in FIG. 5, the terminal apparatus 200 is constituted from a packet communication unit 201, a registration result reception unit 202, a message reception unit 203, a content playback processing unit 204, a communication processing unit 205, a monitor 206, a speaker 207, an input unit 208, and an input/output unit 209.

The terminal apparatus 200 is specifically a computer system constituted from a microprocessor, a ROM, a RAM, a hard disk unit, a display monitor, etc., and achieves its functions as a result of the microprocessor operating in accordance with a computer program stored on the RAM or the hard disk unit.

(1) Communication Processing Unit 205 and Input Unit 208

The input unit 208 receives an input resulting from an operation by the user, and outputs the received input to the communication processing unit 205 as instruction information.

When instruction information indicating registration in the server 100 is received from the input unit 208, the communication processing unit 205 transmits a registration request, which includes the ID2 of the terminal apparatus 200, to the server 100.

Also, when instruction information indicating viewing of content stored on the server 100 is received from the input unit 208, the communication processing unit 205 requests the server 100 to transmit the instructed content.

(2) Packet Communication Unit 201

The packet communication unit 201 receives the measuring packet from the server 100. When the measuring packet is received, the packet communication unit 201 generates the response packet, and transmits the response packet to the server 100 via the input/output unit 209.

(3) Message Reception Unit 203

When text data is received from the server 100 via the input/output unit 209, the message reception unit 203 outputs the text data to the monitor 206.

(4) Registration Result Reception Unit 202

If registration in the server 100 was requested, or if transmission of content was requested, the registration result reception unit 202 receives a processing result from the server 100.

If registration was requested, the registration result reception unit 202 receives a notification of registration, registration completion, or registration cancellation, and displays the received result on the monitor 206. If transmission of content was requested and a notification indicating non-registration is received from the server 100, the registration result reception unit 202 displays on the monitor 206 that the terminal apparatus is unregistered.

(5) Content Playback Processing Unit 204, Monitor 206, and Speaker 207

When content is received from the server 100 via the input/output unit 209, the content playback processing unit 204 generates a video signal and an audio signal from the content, and outputs the video signal and the audio signal to the monitor 206 and the speaker 207, respectively.

The monitor 206 and the speaker 207 output the received video signal and audio signal, respectively.

(6) Input/Output Unit 209

The input/output unit 209 performs the transmission and reception of data to the server 100 via the communication network 500.

2. Operations of the Device Registration System 1

2.1 Operations of the Server 100

Figure 6:
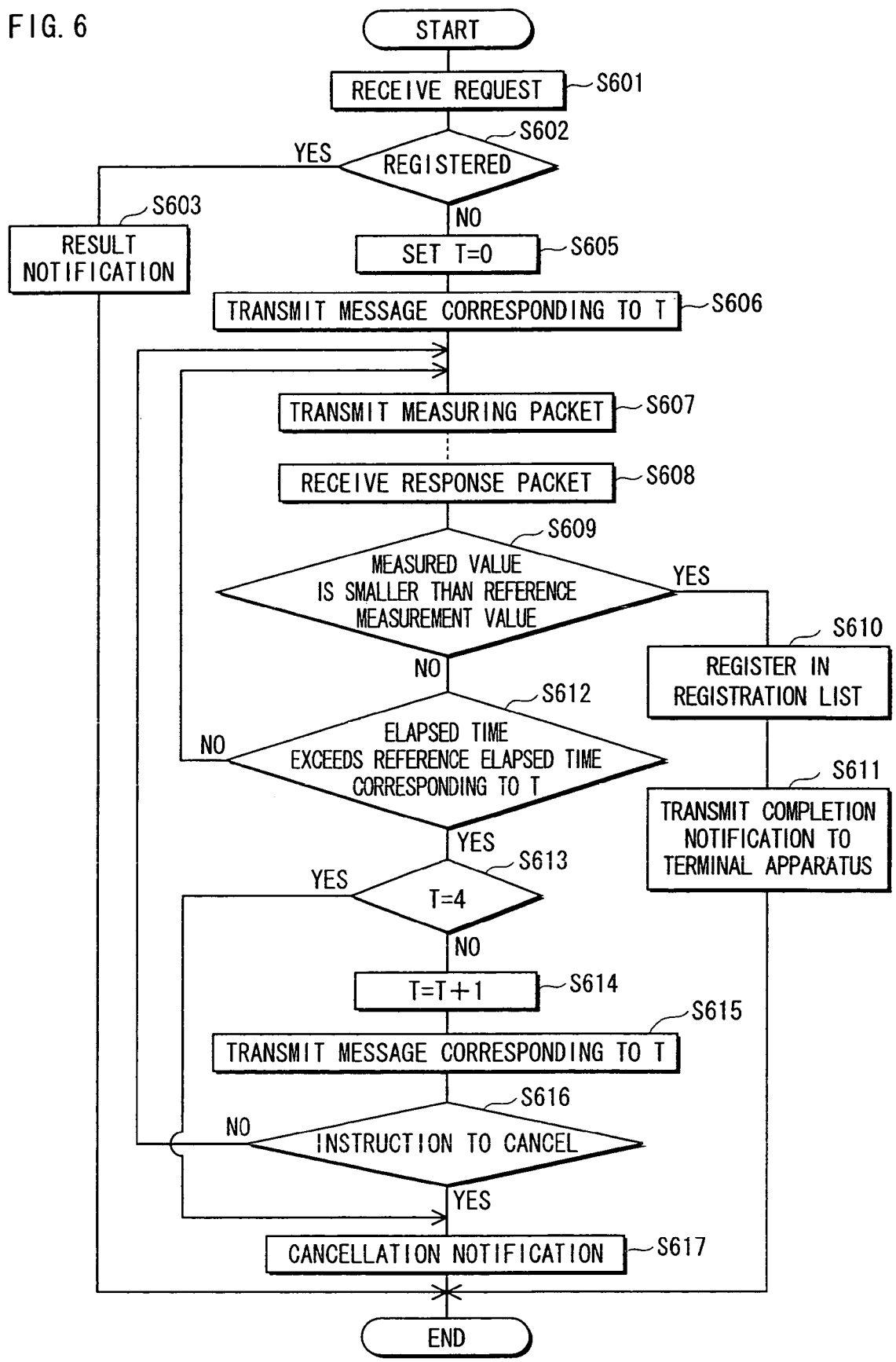
FIG. 6 is a flowchart showing a registration processing operation of the server 100.

The following describes registration operations of the server 100, with reference to FIG. 6.

When a registration request is received from the terminal apparatus via the input/output unit 116 (step S601), the registration check unit 102 reads the registration list from the registration list storage unit 101, and judges whether the ID of the request-source terminal apparatus is registered in the registration list (step S602). If the ID is registered (step S602: YES), the registration check unit 102 notifies the request-source terminal apparatus that it is registered (step S603), and ends registration processing.

If the ID is not registered (step S602: NO), the registration check unit 102 starts registration processing.

First, when the registration processing is started, the elapsed time measuring unit 108 sets the time segment T to "0" (step S605), and notifies the message notification unit 109 that T=0. The message notification unit 109 reads a message which corresponds to T=0 from the message list stored in the message list storage unit 110, and transmits the message to the request-source terminal apparatus (step S606).

The packet transmission unit 106 generates the measuring packet, and transmits the measuring packet to the request-source terminal apparatus (step S607). Also, the measured value check unit 105 measures the time from the transmission of the packet, and the elapsed time measuring unit 108 measures an elapsed time from when the registration processing starts.

When a response is received from the terminal apparatus (step S608), the measured value check unit 105 sets the time from the transmission of the measuring packet to the reception of the response to be the measured value; and compares the measured value with the reference measurement value (step S609). If the measured value is smaller than the reference measurement value (step S609: YES), the measured value check unit 105 outputs the result to the registration processing unit 103. The registration processing unit 103 registers the ID of the request-source terminal apparatus in the registration list (step S610). When registration ends, the communication unit 104 notifies the terminal apparatus 200 that registration is complete (step S611), and ends registration processing.

If the measured value is greater than or equal to the reference measurement value in step S609 (step S609: NO), the elapsed time measuring unit 108 judges whether the measured elapsed time has exceeded a reference elapsed time corresponding to T (step S612). If the reference elapsed time has not been exceeded, processing returns to step S607 and repeats from the transmission of the measuring packet.

If the elapsed time is judged to have exceeded the reference elapsed time and T is not 4 (step S613: NO), the elapsed time measuring unit 108 increments T (step S614), and the message notification unit 109 reads a message corresponding to T from the message list, and transmits the message to the terminal apparatus (step S615). If a request indicating cancellation is received from the terminal apparatus 200 (step S616: YES), the message notification unit 109 transmits a cancellation notification to the terminal apparatus 200 (step S617), and ends further processing. If a cancellation request is not received (step S616: NO), processing returns to step S607, and repeats from the transmission of the measuring packet.

If the elapsed time has exceeded the reference elapsed time, and T=4 (step S613: YES), the message notification unit 109 transmits a processing cancellation notification to the terminal apparatus 200 (step S617), and ends further processing.

2.2 Operations of the Terminal Apparatus 200

Figure 7:
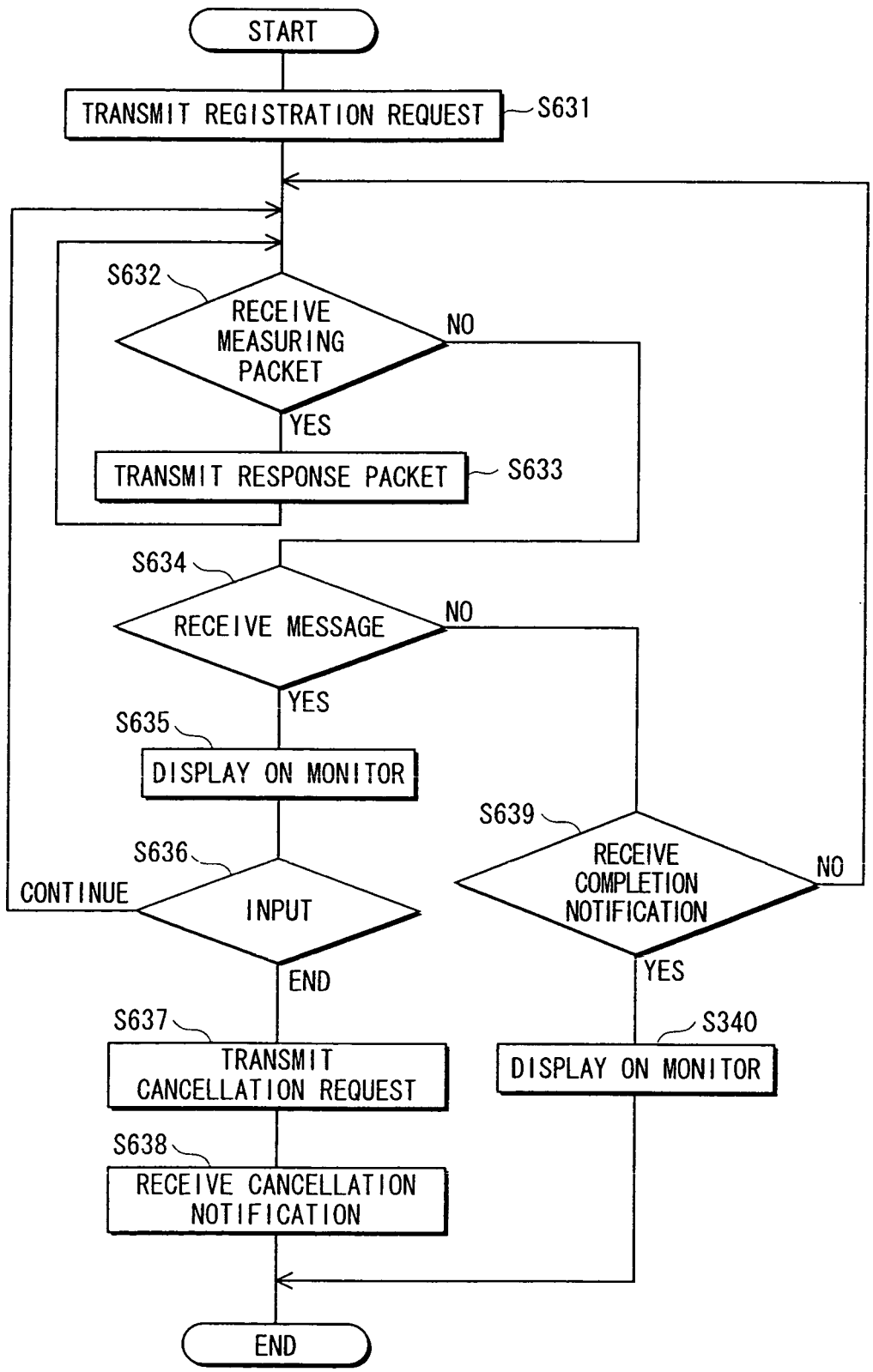
FIG. 7 is a flowchart showing a registration processing operation of the terminal apparatus 200.

The following describes registration processing operations of the terminal apparatus 200, with reference to FIG. 7.

When input indicating registration is received from the input unit 208, the communication processing unit 205 makes a registration request to the server 100 (step S631).

When a measuring packet is received (step S632: YES), the packet communication unit 201 generates a response packet, and transmits the response packet to the server 100 (step S633). If the message reception unit 203 receives a message via the input/output unit 209 (step S634), the message is displayed on the monitor 206 (step S635). Here, if an input from the input unit 208 indicates cancellation (step S636), a cancellation request is transmitted to the server 100 (step S637), and processing is ended when a cancellation notification is received from the server 100 (step S638).

When the registration result reception unit 202 receives a completion notification (step S639: YES), the fact that registration is complete is displayed on the monitor 206 (step S640), and processing is ended. If the completion notification is not received (step S639: NO), processing is continued.

Embodiment 2

Once the terminal apparatus 200 is registered in the first embodiment, it is assumed to be registered indefinitely. The second embodiment considers a case in which a validity period is set during registration, whereby content in the server 100 can be used within the validity period. Furthermore, extension processing of the validity period is performed, whereby the validity period is extended when the extension processing is successful, thereby enabling the user to use content without having to worry about extending the validity period, similar to the case of the terminal apparatus being registered indefinitely.

Note that only portions which differ from the first embodiment are described in the second embodiment. A description of the structure of the terminal apparatus 200 has been omitted since it is similar to the first embodiment.

3.1 Structure of a Server 100b

Figure 8:
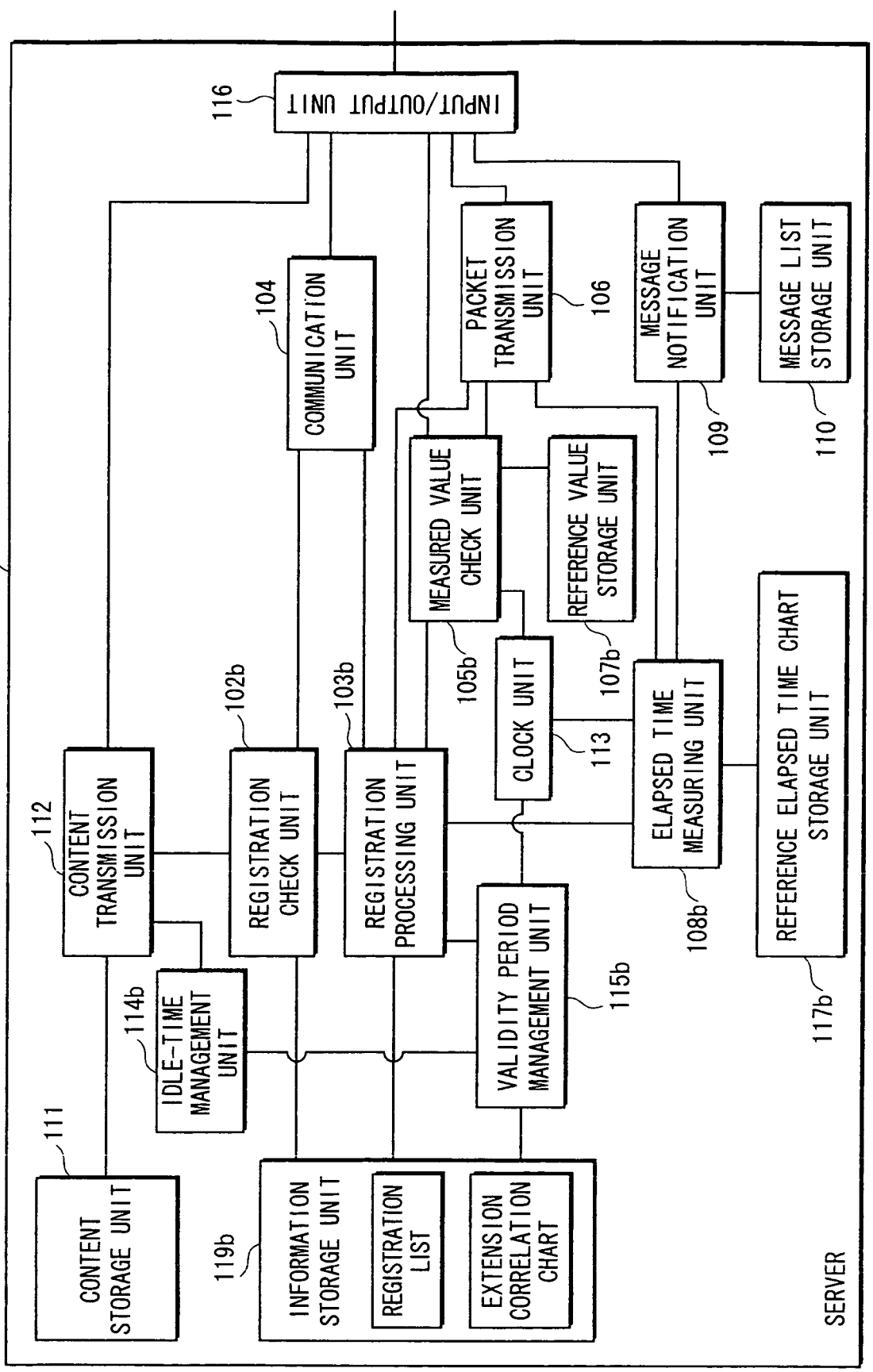
FIG. 8 is a block diagram showing a structure of a server 100b according to embodiment 2.

As shown in FIG. 8, the server 100b is constituted from a registration check unit 102b, a registration processing unit 103b, a communication unit 104, a measured value check unit 105b, a packet transmission unit 106, a reference value storage unit 107b, an elapsed time measuring unit 108b, a message notification unit 109, a message list storage unit 110, a content storage unit 111, a content transmission unit 112, a clock unit 113, an idle-time management unit 114b, a validity period management unit 115b, an input/output unit 116, a reference elapsed time chart storage unit 117b, and an information storage unit 119b.

Descriptions of the communication unit 104, the packet transmission unit 106, the message notification unit 109, the message list storage unit 110, the content storage unit 111, the content transmission unit 112, the clock unit 113, and the input/output unit 116 have been omitted since they are similar to the first embodiment.

The following describes the registration check unit 102b, the registration processing unit 103b, the measured value check unit 105b, the reference value storage unit 107b, the elapsed time measuring unit 108b, the idle-time management unit 114b, the validity period management unit 115b, the reference elapsed time chart storage unit 117b, and the information storage unit 119b, which all differ from the first embodiment.

(1) Information Storage Unit 119b

The information storage unit 119b has stored therein a registration list and an extension correlation chart.

As shown in FIG. 9, the registration list is constituted from registration information for only registered terminal apparatuses, whereby the registration information includes correlated terminal apparatus IDs, validity periods, and extension counts. The validity periods include correlated validity period statuses and remaining durations of validity periods. The duration of a validity period is reduced by the validity period management unit 115b according to a length of time since registration. Specifically, if within the validity period, the valid status and the remaining duration of the validity period are correlated as with ID4 and ID2 of FIG. 9. If the validity period has expired as with ID3 of FIG. 9, the expired status and the remaining duration of the validity period are correlated. The duration is further reduced after the validity period has expired and is shown as "−2" in this case, which shows the number of days since the validity period expired. The extension count shows the number of times a corresponding validity period has been extended. If a terminal apparatus is newly registered, the extension count is set to "0".

As shown in FIG. 10, the extension correlation chart is constituted from correlated extension counts and extension durations (in a number of days). The extension counts correspond to a number of times registration information has been extended, whereby when the validity period is extended, an extension duration corresponding to the extension count of the registration information is added to the previous validity period. For example, if extending a validity period of registration information with an extension count of "3", an extension duration of "19", which corresponds to the extension count of "3" in the extension correlation chart, is added to the previous validity period.

(2) Measured Value Check Unit 105*b* and Reference Value Storage Unit 107*b*

The reference value storage unit 107*b* has stored therein a value to be used in a case of new registration and a value to be used in a case of extension processing as reference values. As an example, the reference value for new registration is set to 5 ms, while the reference value for extension processing is set to 7 ms.

Similarly to the measured value check unit 105 of the first embodiment, the measured value check unit 105*b* measures a time from when the packet transmission unit 106 transmits a measuring packet to when a response packet is received, and also compares the measured time with a reference measurement value stored in the reference value storage unit 107*b*. The measured value is compared with the aforementioned reference measurement value of 5 ms for new registration and the 7 ms for extension processing.

In a case of registering a terminal apparatus whose validity period has expired, the measured value is compared with the same 5 ms for new registration if the duration of expiration exceeds a certain number of days. For example, if 2 days or more have passed-since the validity period has expired, the reference measurement value would be the same 5 ms for a case of new registration, while the reference measurement value would be the same 7 ms for a case of extension processing if less than 2 days have passed.

(3) Elapsed Time Measuring Unit 108*b* and Reference Elapsed Time Chart Storage Unit 117*b*

The reference elapsed time chart storage unit 117*b* has stored therein a reference elapsed time chart shown in FIG. 11. The reference elapsed time chart is constituted from correlated time segments T, registration elapsed times, and extension elapsed times.

Similarly to the first embodiment, the number of time segments T corresponds to the number of message types.

The registration elapsed time is the reference elapsed time in a new registration, while the extension elapsed time is the reference elapsed time when performing extension processing.

Similarly to the first embodiment, the elapsed time measuring unit 108*b* measures an elapsed time from when the registration processing starts, and compares the measured elapsed time with the reference elapsed time. During a new registration, the measured elapsed time is compared with a registration elapsed time corresponding to T, whereas the measure elapsed time is compared with an extension elapsed time corresponding to T during extension processing. Also, in a case of registering a terminal apparatus whose validity period has expired, a registration elapsed time the same as for a new registration is used for comparison if 2 days or more have passed since the validity period expired, whereas an extension elapsed time the same as for extension processing is used for comparison if less than 2 days have passed.

(4) Idle-Time Management Unit 114*b*

The idle-time management unit 114*b* detects idle time where the server 100 is not performing processing. Idle time refers to time when processing such as the transmission of content and registration checking for the transmission of content are not being performed.

When idle time is detected, the idle-time management unit 114*b* outputs information to that effect to the validity period management unit 115*b*.

(5) Validity Period Management Unit 115*b*

The validity period management unit 115*b* performs extension processing when idle time is detected.

First, the validity period management unit 115*b* extracts registration information in which the remaining duration of the validity period is 2 days or less from the registration list, and prioritizes the processing of registration information with lower remaining durations. Note that the validity period management unit 115*b* does not perform extension processing if there is no registration information with a remaining duration of 2 days or less.

The validity period management unit 115*b* also reduces, based on the date and time kept by the clock unit 113, the validity periods of registration information registered in the registration list.

If a validity period expires without being extended, the validity period management unit 115*b* rewrites the validity period to indicate expiration, and then counts the duration from when the validity period expired.

(6) Registration Processing Unit 103*b*

Similarly to the first embodiment, the registration processing unit 103*b* performs registration processing if a registration request is received from a terminal apparatus, and also performs extension processing for that terminal apparatus if the validity period management unit 115*b* extracts registration information which needs to be extended.

Figure 16:
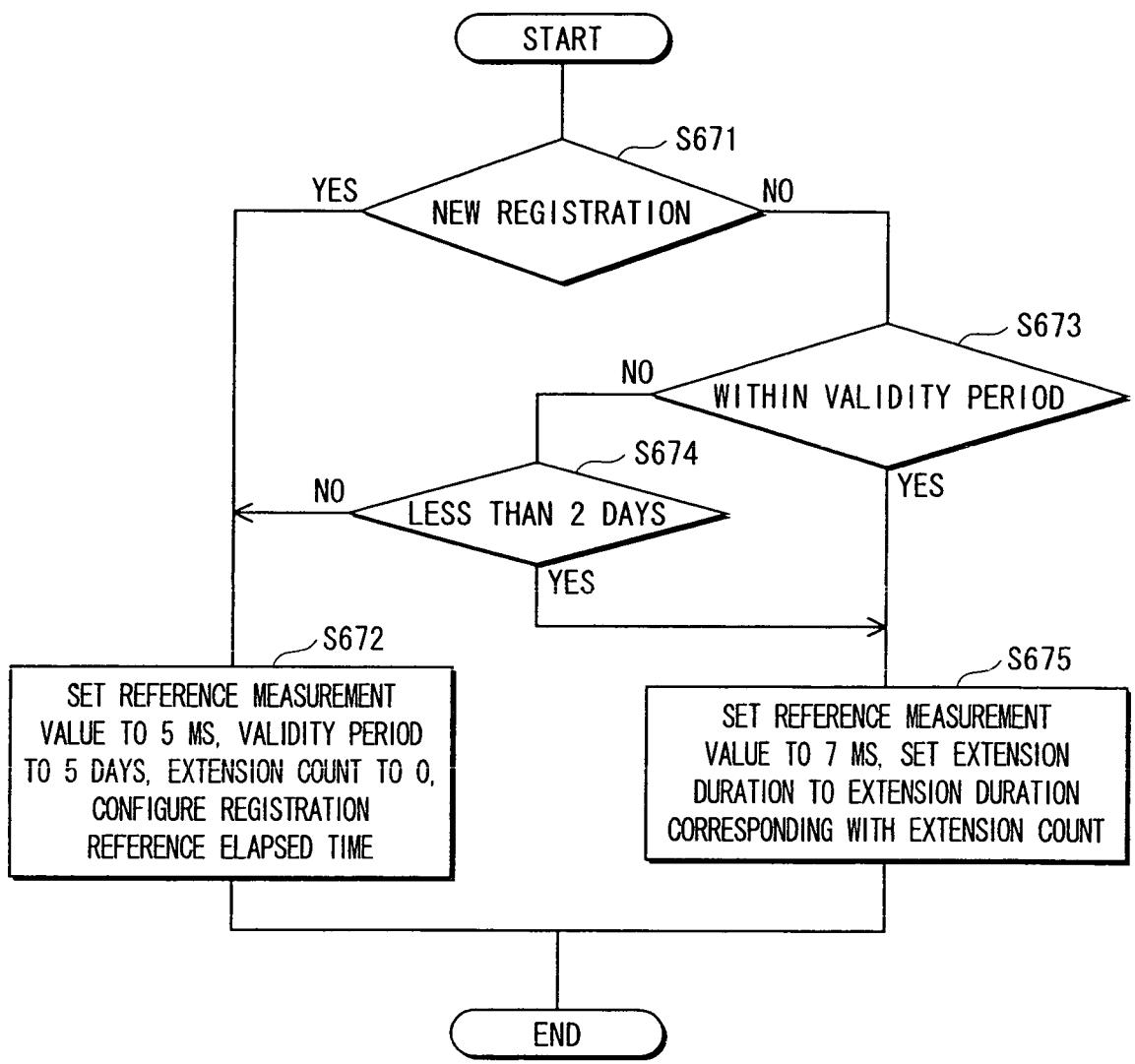
FIG. 16 is a flowchart showing configuration processing of items.

As shown in FIG. 16, in a case of new registration (step S671: YES), the registration processing unit 103*b* sets the reference measurement value to 5 ms, the validity period to 5 days and the extension count to 0, and configures the registration reference elapsed time (step S672). In a case other than new registration (step S671: NO), the registration processing unit 103*b* judges whether the validity period is expired (step S673). If the validity period is not expired, that is, in a case of extension processing (step S673: YES), the reference measurement value is set to 7 ms, and the reference elapsed time is set to the extension reference elapsed time. The registration processing unit 103*b* also checks the extension count registered in the registration list, and sets a corresponding extension duration in the extension correlation chart as an extension duration to be added to the validity period (step S675).

If the validity period is expired in step S673 (step S673), that is, in a case of re-registering a terminal apparatus whose validity period is expired, the registration processing unit 103*b* judges whether less than 2 days have passed since the expiration. If less than 2 days, the registration processing unit 103*b* sets the reference measurement value to 7 ms, sets the extension reference elapsed time, and sets the extension duration corresponding to the extension count, similarly to the case of extension processing. If 2 days or more have passed since the expiration, the registration processing unit 103*b* sets the reference measurement value to 5 ms, and performs configuration of the registration reference elapsed time, the validity period, and the extension count (step S672), similarly to the case of new registration.

4. Operations 4.1 Registration Processing Operations by the Server 100b

Figure 12:
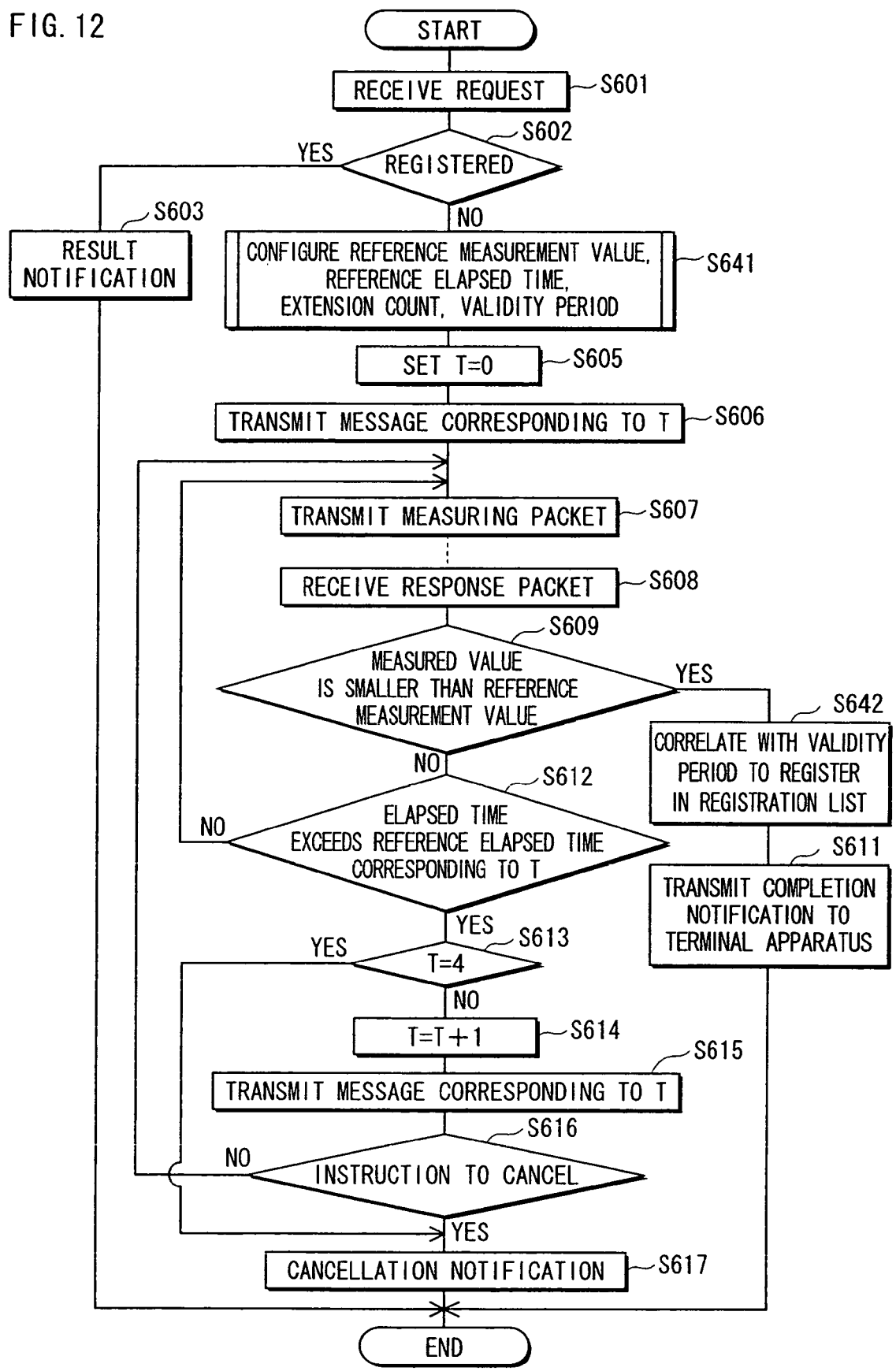
FIG. 12 is a flowchart showing a new registration processing operation of the server 100b.

The following describes operations of the server 100b when performing a new registration of the terminal apparatus 200, with reference to FIG. 12.

Note that operations which are the same as registration processing operations of the server 100 in the first embodiment (shown in FIG. 6) have been given the same processing step numbers, and their description has been omitted. The following description centers on the differing operations.

In steps S601 and S602, a registration request is received from the terminal apparatus 200, and if the terminal apparatus 200 is judged to be unregistered, the reference measurement value, the reference elapsed time, the extension count, and the validity period are configured (step S641) as previously mentioned.

Note that details of the configuration processing of the reference measurement value, the reference elapsed time, the extension count, and the validity period in step S641 are as previously described using FIG. 16.

Registration processing is performed as in steps S605 to S617 using the configured reference measurement value and reference elapsed time. If the measured value is judged to be smaller than the reference measurement value in step S609, the validity period of "5 days" and the extension count "0" set in step S642 are correlated with the ID2 of the terminal apparatus 200 which is written to the registration list. The communication unit 104 transmits to the terminal apparatus 200 a completion notification indicating that registration processing ended, and ends processing.

4.2 Extension Processing Operations by the Server 100b

Figure 13:
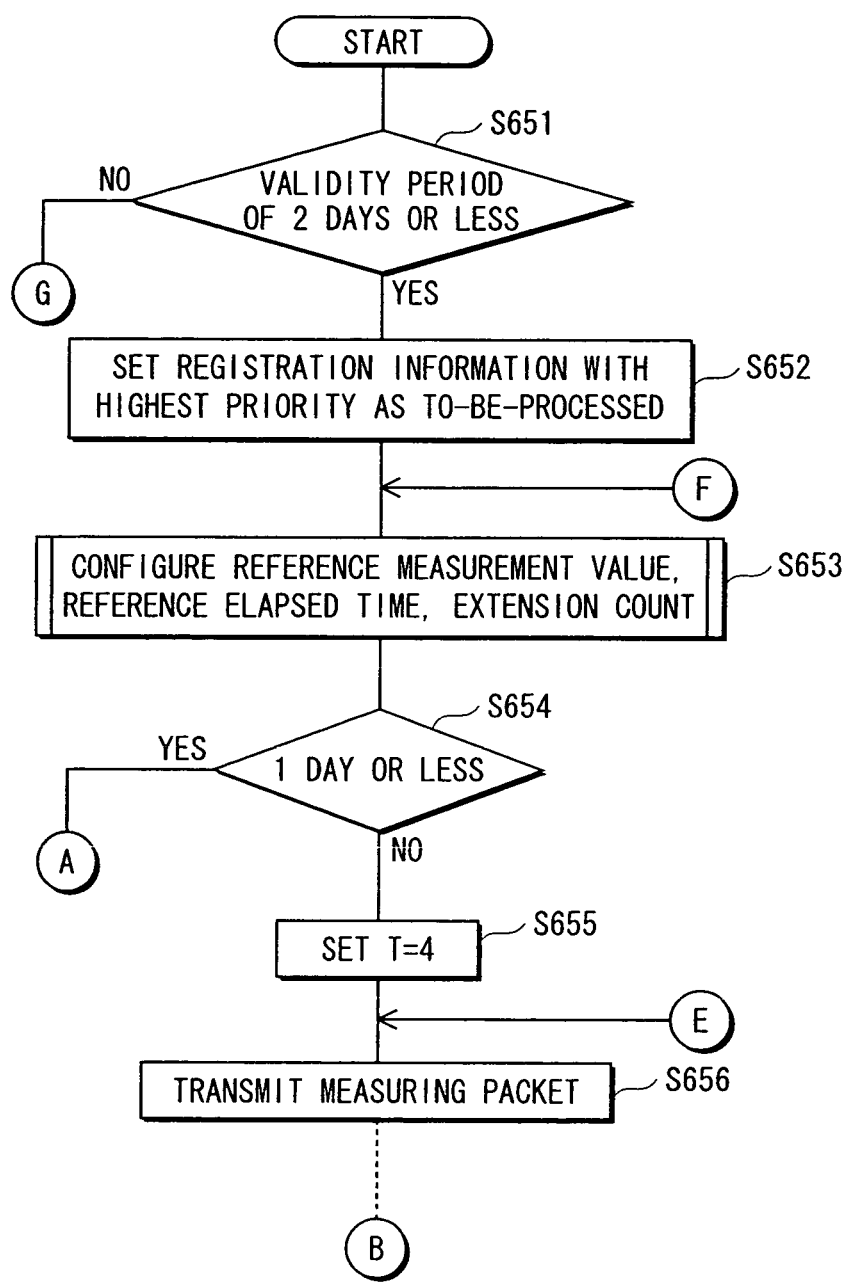
FIG. 13 is a flowchart showing an extension processing operation of the server 100b (cont. to FIG. 14)
Figure 14:
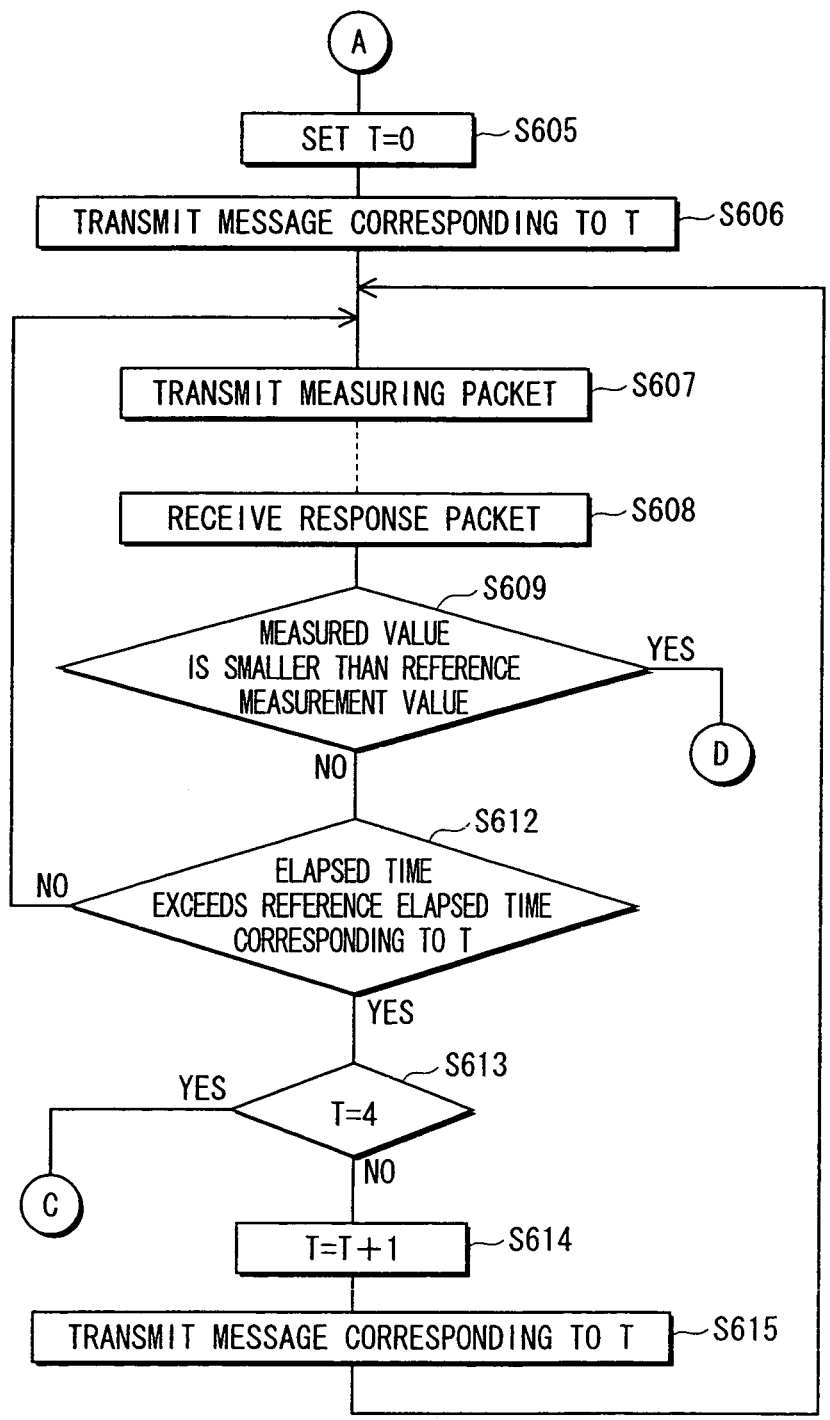
FIG. 14 is a flowchart showing an extension processing operation of the server 100b (cont. from FIG. 13, cont. to FIG. 15)
Figure 15:
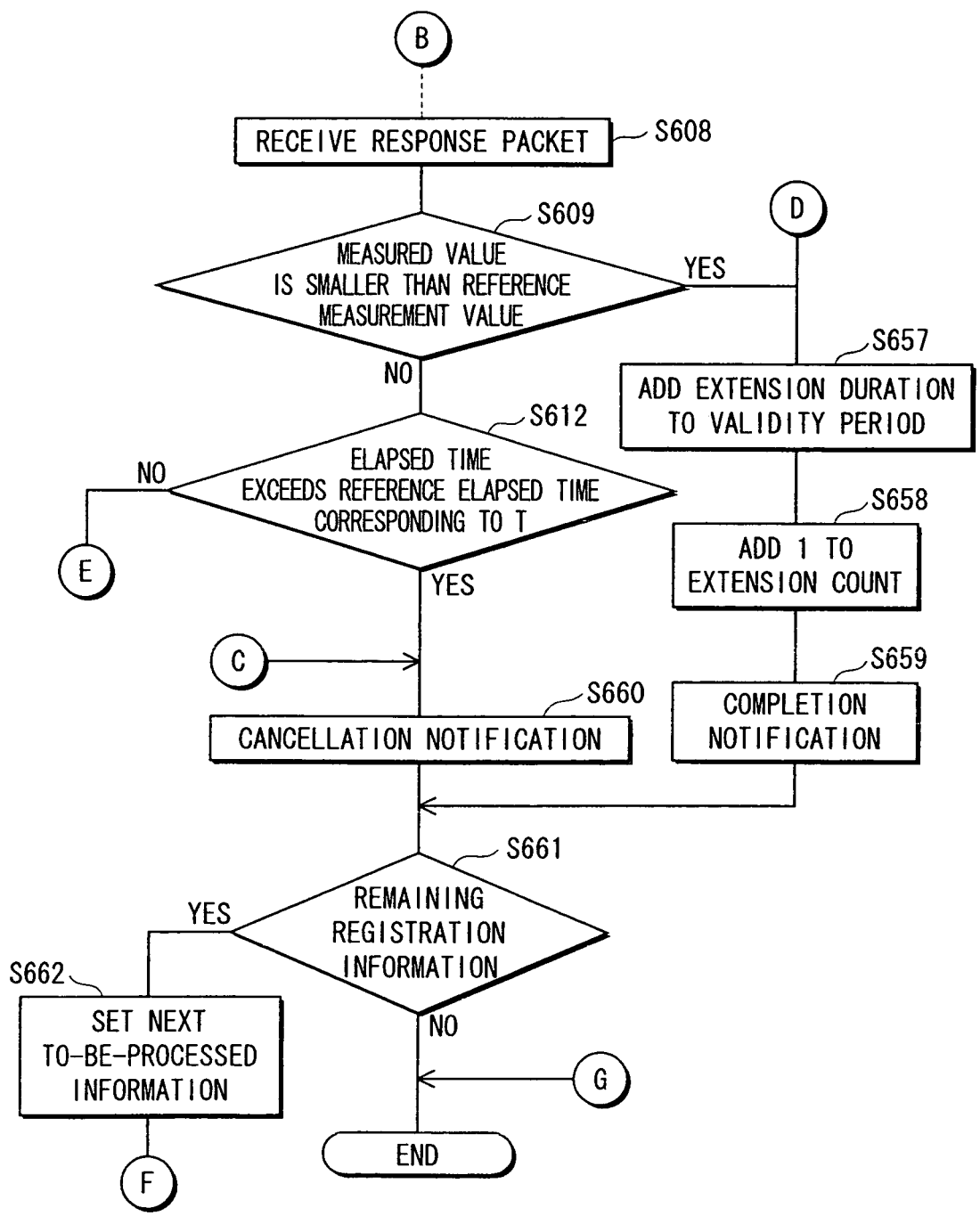
FIG. 15 is a flowchart showing an extension processing operation of the server 100b (cont. from FIG. 14)

The following describes extension processing operations of the validity period by the server 100b, with reference to FIGS. 13 to 15. Note that operations which are the same as registration processing operations of the server 100 in the first embodiment (shown in FIG. 6) have been given the same processing step numbers, and their description has been omitted.

When the idle-time management unit 114b detects idle time, the validity period management unit 115b judges whether there is registration information in which a validity period is two days or less in the registration list (step S651), and ends extension processing if the judgment is negative. If the judgment is affirmative, the idle-time management unit 114b sets the highest priority registration information as to-be-processed (step S652).

The registration processing unit 103b configures the reference measurement value, the reference elapsed time, and the extension duration based on the to-be-processed registration information. Note that details of the configuration processing of the reference measurement value, the reference elapsed time, and the extension duration in step S653 are as previously described using FIG. 16. The registration processing unit 103b also judges whether the validity period is one day or less (step S654). If the judgment is negative (step S654: NO), the registration processing unit 103b sets T=4 (step S655), and the packet transmission unit 106 transmits the measuring packet (step S656). The measured value check unit 105b receives the response packet, measures the time from when the measuring packet was transmitted to when the response packet was received, and compares the measured value with the reference measurement value. In a case where the measured value is judged to be greater than or equal to the reference measurement value, and an elapsed time measured by the elapsed time measuring unit 108 is within a reference elapsed time corresponding to T (step S612: NO), processing returns to step S656, and the transmission and reception of the packets are repeated. If the measured value is greater than or equal to the reference measurement value and the elapsed time has exceeded the reference elapsed time (step S612: YES), a cancellation notification is transmitted to the terminal apparatus 200 (step S660), and extension processing related to the to-be-processed registration information is ended. If there is unprocessed registration information with a validity period of two days or less (step S661: YES), the next highest priority registration information is set as to-be-processed (step S662), and extension processing is performed from step S653. If there is no unprocessed registration information (step S661), extension processing is ended.

5. Other Variations

Note that the present invention has been described based on the above embodiments, although the present invention is certainly not limited to the above embodiments. The following cases are also included in the present invention.

(1) The server 100 transmits text data messages to the terminal apparatus in the first and second embodiments, although the terminal apparatus may have the messages stored therein.

In such a case, the terminal apparatus stores correlated messages and identification information which identifies the messages. The server 100 holds correlated elapsed time segments and identification information corresponding to elapsed times. The server 100 measures an elapsed time from when the registration processing or extension processing starts, and transmits corresponding identification information according to an elapsed time segment. The terminal apparatus reads a message which corresponds to the received identification information, and displays the message on the monitor.

Note that the server 100 may transmit the elapsed time itself, rather than identification information, to the terminal apparatus, whereby the terminal apparatus has stored therein elapsed time segments and corresponding messages and displays on the monitor a message which corresponds to the received elapsed time.

Note that the messages are for notifying the user of a status, and may be a character string or image data.

(2) When requesting the server to perform registration, the terminal apparatus may encrypt its ID before transmission.

Messages transmitted from the server to the terminal apparatus may also be encrypted before transmission.

As a result, it is possible to prevent tampering and spoofing of the ID and messages. Also, the user can carry out the registration processing without concern since the terminal apparatus follows precise messages transmitted from the server.

Also, the server and terminal apparatus may share a key in advance, and data dependent on the shared key may be stored in the measuring packet or the response before transmission.

As a result, it is possible to prevent tampering and falsification of packets.

Also, a signature of the server 100 may be attached to the completion notification from the server. As a result, it is possible to prevent tampering and falsification of the completion notification.

(3) Validity periods are shown as a remaining number of days in the second embodiment, although a date of the expiring day may be registered as the validity period.

(4) Extensions of validity periods vary according to an extension count in the second embodiment, although the period of extension may be fixed.

(5) The reference measurement value varies during registration and during extension in the second embodiment, although the same reference measurement value may be used. Also, the reference measurement value is divided into two categories of registration and extension, although it may be divided into more categories depending on how many times extension has been performed.

(6) Extension processing of validity periods is performed if idle time is detected, although a priority of the extension processing may be modified according to the validity periods. For example, extension processing is performed after raising its priority over other processing when a remaining duration of the validity period falls below a provided reference value, thereby facilitating the possibility of extension during the validity period.

(7) The transmission and reception of measuring packets and response packets in extension processing may be prioritized over other processing, such as the viewing of content, when a validity period approaches the end.

The following describes a case in which extension processing is prioritized.

(A) A Case of Prioritizing Extension Processing in the Server and the Terminal Apparatus The server prioritizes the transmission of the measuring packet over other processing when the validity period falls below a predetermined reference value. When the measuring packet is received, the terminal apparatus immediately generates and transmits a response packet. The priority of this processing is raised above other processing such as the viewing of content.

Note that in this case, it is necessary for the terminal apparatus to store a validity period, manage the validity period according to a current date and time, and judge whether the validity period is below the reference value. Here, other processing refers to the viewing of content, etc.

(B) A Case of Raising a Priority of a Packet on a Communication Route

Additional information showing priority is attached to the packet to be transmitted and received. The packet is processed on the communication route depending on the additional information.

When the remaining duration of a validity period becomes low, the server attaches high-priority additional information to the measuring packet before transmission, whereupon the measuring packet reaches the terminal apparatus relatively quickly even if the communication route is congested.

The terminal apparatus also attaches additional information showing high priority to the response packet before replying since the additional information of the measuring packet shows high priority.

As a result, there is an increased possibility that the measured value on the server will be lower than the reference measurement value, and registration is performed smoothly.

(8) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on the recording medium.

Also, the present invention may be the computer programs or digital signals which are transmitted via an telecommunications circuit, a wireless or cable communications circuit, a network typified as the Internet, a data broadcast, etc.

Also, the present invention may: be a computer system including a microprocessor and a memory, whereby the memory stores the computer programs, and the microprocessor operates in accordance with the computer programs.

Also, the present invention may be carried out by another independent computer system by transferring the programs or the digital signals which have been recorded on the recording media, or by transferring the programs or the digital signals via the network, etc.

(9) The present invention may be any combination of the above embodiment and the above variations.

INDUSTRIAL APPLICABILITY

The present invention can be used operationally as well as recurrently and continually in a software industry which provides software such as computer programs and content which includes digitized copyrighted works such as movies and music. The server and terminal apparatus of the present invention can be produced and retailed in manufacturing industries for electrical products and the like.

The invention claimed is:

1. A server comprising:
a memory storing a program; and
a processor operable to execute the program,
wherein the processor, when executing the program, operates as:
a content storage unit storing content;
a registration unit in which a terminal apparatus permitted to use the content is registered;
a packet transmission unit, upon receiving a registration request for using the content from an unregistered terminal apparatus via a network, transmitting a measuring packet to the unregistered terminal apparatus via the network;
a measured value check unit receiving, from the unregistered terminal apparatus, a response packet in response to the measuring packet, and comparing a measured value with a predetermined reference measurement value, the measured value indicating a length of time from the transmission of the measuring packet by the packet transmission unit to the receipt of the response packet by the measured value check unit;
a registration processing unit, (a) when the measured value is smaller than the predetermined reference measurement value, registering the unregistered terminal apparatus in the registration unit, and (b) when the measured value is larger than or equal to the predetermined reference measurement value, causing the packet transmission unit to newly transmit the measuring packet to the unregistered terminal apparatus, and register the unregistered terminal apparatus in the registration unit when the measured value for the newly transmitted measuring packet is smaller than the predetermined reference measurement value;
a processing status storage unit storing time segments and status notification information pieces in one-to-one correspondence, the time segments being obtained by dividing a time elapsed from the packet transmission unit receiving the registration request; and
a notification unit, when the measured value is larger than or equal to the predetermined reference measurement value, and when the time elapsed from the packet transmission unit receiving the registration request exceeds any of the obtained time segments, notifying the terminal apparatus of a stored status notification information piece, of the stored status notification information pieces, corresponding to the obtained time segment exceeded by the time elapsed from the packet transmission unit receiving the registration request, wherein the registration processing unit, (a) when registering the unregistered terminal apparatus in the registration unit, sets a validity period of the registration of the unregistered terminal apparatus being registered, (b) when receiving the registration request from the registered terminal apparatus within the set validity period, causes the packet transmission unit to transmit the measuring packet to the registered terminal apparatus, (c) when the measured value is smaller than another reference measurement value, performs extension processing to extend the set validity period, and (d) when the measured value is larger than or equal to the other reference measurement value, causes the packet transmission unit to newly transmit the measuring packet to the registered terminal apparatus and performs the extension processing to extend the set validity period when the measured value for the newly transmitted measuring packet is smaller than the other reference measurement value.

2. The server of claim 1, wherein the other reference measurement value is larger than the predetermined reference measurement value.

3. The server of claim 1, wherein the registration processing unit counts an extension count that is a number of times the extension processing has been performed, and lengthens a period of extension of the set validity period as the extension count increases.

4. The server of claim 1, wherein the server further comprises an idle-time management unit detecting an idle time when either transmission of the content or a registration check before the transmission of the content is not being performed, and wherein the registration processing unit performs the extension processing during the idle time.

5. The server of claim 1, wherein the registration processing unit prioritizes performing the extension processing over other processing when a remaining duration of the set validity period is less than a preset value.

6. An apparatus registration system including:
a server storing content; and
an unregistered terminal apparatus for using the content, wherein the server comprises:
a content storage unit storing the content;
a registration unit in which a terminal apparatus permitted to use the content is registered;
a packet transmission unit configured, upon receiving a registration request for using the content from the unregistered terminal apparatus via a network, to transmit a measuring packet to the unregistered terminal apparatus via the network;
a measured value check unit configured to receive, from the unregistered terminal apparatus, a response packet in response to the measuring packet, and configured to compare a measured value with a predetermined reference measurement value, the measured value indicating a length of time from the transmission of the measuring packet by the packet transmission unit to the receipt of the response packet by the measured value check unit;
a registration processing unit configured, (a) when the measured value is smaller than the predetermined reference measurement value, to register the unregistered terminal apparatus in the registration unit, and (b) when the measured value is larger than or equal to the predetermined reference measurement value, to cause the packet transmission unit to newly transmit the measuring packet to the unregistered terminal apparatus, and register the unregistered terminal apparatus in the registration unit when the measured value for the newly transmitted measuring packet is smaller than the predetermined reference measurement value;
a processing status storage unit storing time segments and status notification information pieces in one-to-one correspondence, the time segments being obtained by dividing a time elapsed from the packet transmission unit receiving the registration request; and
a notification unit configured, when the measured value is larger than or equal to the predetermined reference measurement value, and when the time elapsed from the packet transmission unit receiving the registration request exceeds any of the obtained time segments, to notify the terminal apparatus of a stored status notification information piece, of the stored status notification information pieces, corresponding to the obtained time segment exceeded by the time elapsed from the packet transmission unit receiving the registration request, wherein the unregistered terminal apparatus comprises:
a communication processing unit configured to transmit the registration request to the server;
a packet communication unit configured to receive the measuring packet from the server and transmit the response packet to the server; and
a display unit configured to display a message based on the status notification information piece notified by the server, and wherein the registration processing unit, (a) when registering the unregistered terminal apparatus in the registration unit, sets a validity period of the registration of the unregistered terminal apparatus being registered, (b) when receiving the registration request from the registered terminal apparatus within the set validity period, causes the packet transmission unit to transmit the measuring packet to the registered terminal apparatus, (c) when the measured value is smaller than another reference measurement value, performs extension processing to extend the set validity period, and (d) when the measured value is larger than or equal to the other reference measurement value, causes the packet transmission unit to newly transmit the measuring packet to the registered terminal apparatus and performs the extension processing to extend the set validity period when the measured value for the newly transmitted measuring packet is smaller than the other reference measurement value.

7. An apparatus registration method performed by a server, wherein the server includes a processor configured to operate as:
a content storage unit;
a registration unit;
a packet transmission unit;
a measured value check unit;
a registration processing unit;
a processing status storage unit; and a notification unit,
wherein the apparatus registration method comprises:
a content storage step of storing content via the content storage unit;
a registration step of registering, via the registration unit, a terminal apparatus permitted to use the content;
a packet transmission step of, upon receiving a registration request for using the content stored in the content storage unit from an unregistered terminal apparatus via a network, transmitting, via the packet transmission unit, a measuring packet to the unregistered terminal apparatus via the network;
a measured value check step of receiving, via the measured value check unit and from the unregistered terminal apparatus, a response packet in response to the measuring packet, and of comparing, via the measured value check unit, a measured value with a predetermined reference measurement value, the measured value indicating a length of time from the transmission of the measuring packet by the packet transmission step to the receipt of the response packet by the measured value check step;
a registration processing step of, (a) when the measured value is smaller than the predetermined reference measurement value, registering, via the registration processing unit, the unregistered terminal apparatus in the registration unit, and (b) when the measured value is larger than or equal to the predetermined reference measurement value, causing, via the registration processing unit, the packet transmission step to newly transmit the measuring packet to the unregistered terminal apparatus, and registering, via the registration processing unit, the unregistered terminal apparatus in the registration unit when the measured value for the newly transmitted measuring packet is smaller than the predetermined reference measurement value;
a processing status storage step of storing, via the processing status storage unit, time segments and status notification information pieces in one-to-one correspondence, the time segments being obtained by dividing a time elapsed from the packet transmission step receiving the registration request; and
a notification step of, when the measured value is larger than or equal to the predetermined reference measurement value, and when the time elapsed from the packet transmission step receiving the registration request exceeds any of the obtained time segments, notifying, via the notification unit, the terminal apparatus of a stored status notification information piece, of the stored status notification information pieces, corresponding to the obtained time segment exceeded by the time elapsed from the packet transmission step receiving the registration request, and
wherein the registration processing step, (a) when registering the unregistered terminal apparatus in the registration unit, sets, via the registration processing unit, the validity period of the registration of the unregistered terminal apparatus being registered, (b) when receiving the registration request from the registered terminal apparatus within the set validity period, causes, via the registration processing unit, the packet transmission step to transmit the measuring packet to the registered terminal apparatus, (c) when the measured value is smaller than the other reference measurement value, performs, via the registration processing unit, the extension processing to extend the set validity period, and (d) when the measured value is larger than or equal to the other reference measurement value, causes, via the registration processing unit, the packet transmission step to newly transmit the measuring packet to the registered terminal apparatus and performs, via the registration processing unit, the extension processing to extend the set validity period when the measured value for the newly transmitted measuring packet is smaller than the other reference measurement value.

8. A non-transitory computer-readable recording medium having a registration program recorded thereon, the registration program being used in a server,
wherein the server is a computer,
wherein the registration program causes the server to execute a method comprising:
a content storage step of storing content in a content storage unit;
a registration step of registering, in a registration unit, a terminal apparatus permitted to use the content;
a packet transmission step of, upon receiving a registration request for using the content stored in the content storage unit from an unregistered terminal apparatus via a network, transmitting a measuring packet to the unregistered terminal apparatus via the network;
a measured value check step of receiving, from the unregistered terminal apparatus, a response packet in response to the measuring packet, and of comparing a measured value with a predetermined reference measurement value, the measured value indicating a length of time from the transmission of the measuring packet by the packet transmission step to the receipt of the response packet by the measured value check step;
a registration processing step of, (a) when the measured value is smaller than the predetermined reference measurement value, registering the unregistered terminal apparatus in the registration unit, and (b) when the measured value is larger than or equal to the predetermined reference measurement value, causing the packet transmission step to newly transmit the measuring packet to the unregistered terminal apparatus, and registering the unregistered terminal apparatus in the registration unit when the measured value for the newly transmitted measuring packet is smaller than the predetermined reference measurement value;
a processing status storage step of storing time segments and status notification information pieces in one-to-one correspondence, the time segments being obtained by dividing a time elapsed from the packet transmission step receiving the registration request; and
a notification step of, when the measured value is larger than or equal to the predetermined reference measurement value, and when the time elapsed from the packet transmission step receiving the registration request exceeds any of the obtained time segments, notifying the terminal apparatus of a stored status notification information piece, of the stored status notification information pieces, corresponding to the obtained time segment exceeded by the time elapsed from the packet transmission step receiving the registration request, and
wherein the registration processing step, (a) when registering the unregistered terminal apparatus in the registration unit, sets the validity period of the registration of the unregistered terminal apparatus being registered, (b) when receiving the registration request from the registered terminal apparatus within the set validity period, causes the packet transmission step to transmit the measuring packet to the registered terminal apparatus, (c) when the measured value is smaller than the other reference measurement value, performs the extension processing to extend the set validity period, and (d) when the measured value is larger than or equal to the other reference measurement value, causes the packet transmission step to newly transmit the measuring packet to the registered terminal apparatus and performs, via the registration processing unit, the extension processing to extend the set validity period when the measured value for the newly transmitted measuring packet is smaller than the other reference measurement value.

\* \* \* \* \*